United States Patent
Jones, III et al.

(10) Patent No.: US 6,850,601 B2
(45) Date of Patent: Feb. 1, 2005

(54) CONDITION DETECTION AND NOTIFICATION SYSTEMS AND METHODS

(75) Inventors: Russell K. Jones, III, Palo Alto, CA (US); Mark S. West, Palo Alto, CA (US); G. Mark Miller, Alamo, CA (US)

(73) Assignee: Sentinel Vision, Inc., Palo Alto, CA (US)

( * ) Notice: Subject to any disclaimer, the term of this patent is extended or adjusted under 35 U.S.C. 154(b) by 70 days.

(21) Appl. No.: 10/442,551

(22) Filed: May 20, 2003

(65) Prior Publication Data

US 2004/0151282 A1 Aug. 5, 2004

Related U.S. Application Data

(60) Provisional application No. 60/382,724, filed on May 22, 2002.

(51) Int. Cl.[7] ............................................. H04M 11/04
(52) U.S. Cl. ......................................... 379/45; 379/37
(58) Field of Search ........... 379/37–51, 102.02–102.04, 379/106.02

(56) References Cited

U.S. PATENT DOCUMENTS

| | | | |
|---|---|---|---|
| 4,241,335 A | 12/1980 | Barnes ........................ 340/507 |
| 4,390,750 A | 6/1983 | Bartelink ..................... 179/5 R |
| 5,061,916 A | 10/1991 | French et al. ................ 340/522 |
| 5,144,661 A | 9/1992 | Shamosh et al. ............... 380/9 |
| 5,225,997 A | 7/1993 | Lederer et al. ............. 364/550 |
| 5,283,816 A | 2/1994 | Gomez Diaz ................. 379/40 |
| 5,465,297 A | 11/1995 | Azem ......................... 379/387 |
| 5,565,844 A | 10/1996 | Bedrosian .................... 340/567 |
| 5,566,339 A | 10/1996 | Perholtz et al. ............. 395/750 |
| 5,629,687 A | 5/1997 | Sutton et al. .......... 340/825.37 |
| 5,717,378 A | 2/1998 | Malvaso et al. ............. 340/506 |
| 5,764,729 A | 6/1998 | Black et al. .................. 379/44 |
| 5,799,062 A * | 8/1998 | Lazzara et al. ............... 379/51 |
| 5,842,182 A | 11/1998 | Bonner et al. ................ 705/32 |
| 5,905,436 A | 5/1999 | Dwight et al. ........... 340/573.1 |
| 5,923,731 A | 7/1999 | McClure ....................... 379/33 |
| 5,923,732 A | 7/1999 | Nakamura ............... 379/88.18 |
| 5,926,100 A | 7/1999 | Escolar ..................... 340/691.3 |
| 5,930,355 A | 7/1999 | Poston ........................ 379/451 |
| 5,991,429 A | 11/1999 | Coffin et al. ................ 382/118 |
| 6,049,273 A | 4/2000 | Hess .......................... 340/539 |
| 6,061,447 A | 5/2000 | Poston ........................ 379/451 |
| 6,081,546 A | 6/2000 | Williamson et al. .......... 375/33 |
| 6,094,134 A | 7/2000 | Cohen ........................ 340/506 |
| 6,104,785 A | 8/2000 | Chen ............................ 379/49 |
| 6,134,303 A | 10/2000 | Chen ............................ 379/49 |
| 6,147,601 A | 11/2000 | Sandelman et al. ......... 340/506 |
| 6,160,477 A | 12/2000 | Sandelman et al. ......... 340/506 |
| 6,204,760 B1 | 3/2001 | Brunius ...................... 340/529 |
| 6,442,241 B1 * | 8/2002 | Tsumpes ...................... 379/45 |
| 6,553,100 B1 * | 4/2003 | Chen et al. ................... 379/37 |

OTHER PUBLICATIONS

Journal News Brief for TELALERT, Machine Design, vol. 69, No. 5, Mar. 6, 1997, p. 30; cited by applicants.*

* cited by examiner

*Primary Examiner*—Wing F Chan
(74) *Attorney, Agent, or Firm*—Schneck & Schneck; Thomas Schneck; Gina McCarthy

(57) ABSTRACT

The security detection system includes a detection unit capable of detecting a condition, said unit in communication with a remote central server. Where the detection unit is connected to the server via a dial-up modem, the detection system may be connected to a telephone seizure unit. Upon occurrence and detection of a condition, the detection unit prevents a telephone from communicating with a main telephone line, while still allowing said detection unit to communicate electronic information to the server, even upon lifting of the telephone receiver from the base. Once electronic information is sent to the server, a programmed database of the server may send the information according to a pre-determined designation. The server monitors whether a designated party has responded to the information, and if not, may send the information to a human monitoring station. The designated party may request and receive additional information from the detection unit, via the server.

40 Claims, 4 Drawing Sheets

CONDITION DETECTION AND NOTIFICATION SYSTEMS AND METHODS

RELATED APPLICATIONS

This application claims priority from U.S. Provisional Application having Ser. No. 60/382,724, filed on May 22, 2002.

FIELD OF THE INVENTION

The invention relates to security detection and notification systems and methods.

BACKGROUND OF THE INVENTION

Security systems are known in the art to prevent crimes and to notify security personnel of when an intrusion, or other triggering event such as a fire, is occurring.

Oftentimes, such security systems are connected to a telephone line to dial out an alert. Because many locations have a single telephone line, if the telephone of the single telephone line is lifted off the hook, inadvertently by a user, or intentionally by an intruder, or is otherwise in use, a security system connected to the telephone line is not able to dial an alert out to security personnel.

The following are examples of prior art which attempt to overcome this problem. U.S. Pat. No. 5,923,732 describes a security alarm system having a switch to command the telephone line. The main control unit of the system is connected directly to an incoming telephone line and outputs are provided to connect it to a telephone. The unit is capable of receiving alarm signals from remote sensing means. Upon receipt of the alarm signal a processing means disconnects the telephone extensions from the incoming telephone line and allows the system to seize control of the incoming telephone line for a processing means within the main control unit to execute a predetermined response, such as sending out alarm messages. A panic dial out alarm such as a telephone input of a code will override a line dead or line busy alarm. The seizing unit sends out alarm messages through the telephone line.

U.S. Pat. No. 6,081,546 provides that with the detection of an alarm condition at a security alarm system that requires a communications link, line seizure is effected via a seizure circuit serially connected between each telephone handset and the telephone line. A line monitor within a system controller shorts the telephone line to drive any conducting line seizure circuits into a non-conducting condition that is maintained sufficiently long to permit the system controller to gain control of the line. As above, the seizing unit is a part of the system controller unit responsible for sending out alarm messages.

U.S. Pat. Nos. 5,930,355 and 5,764,729 describe tamper protection devices for protecting a telephone operated security alarm system. In U.S. Pat. No. 5,764,729, the protection device includes a vibration sensor which, when activated, informs a security monitor of the activation before an intruder can disable the alarm. In U.S. Pat. No. 5,930,355, the protection device includes a shield which, when tampered with, will trigger an alarm.

In U.S. Pat. No. 5,465,297, a telephone seizure unit operates so that when the automatic dialer is on-hook, the telephone line seizure unit will be transparent to the telephone systems and the telephones will operate normally. When the automatic dialer goes off-hook the telephone line seizure unit disconnects any telephone in use, which thereby allows the automatic dialer unimpeded access to the telephone lines for a pre-determined period of time to send out the alarm detection signal to a central security office.

In U.S. Pat. No. 4,390,750, auxiliary equipment creates an off-hook condition when an alarm condition occurs. If an abnormal condition occurs at the premises, the condition is sensed by one of the sensors, which transmits a signal to the auxiliary equipment. The equipment in response creates a temporary off-hook condition and transmits alarm report signals to the central office and then goes back on-hook. The off-hook condition need last only a few seconds for the alarm report to be completed.

Additionally, systems which allow for user flexibility in alert notification and monitoring of occurrences of specific conditions are also desired.

U.S. Pat. No. 6,147,601 describes a system and a method for monitoring remote equipment. A sensor is in communication with a piece of remote equipment, and an interface unit having a message generating mechanism is connected to the sensor. A central computer server is in communication with the interface unit and is adapted to receive messages generated by the interface unit. When the sensor detects an exception in the piece of remote equipment the interface unit generates an incoming exception message and forwards the message to the server. The server forwards the message to at least one user-defined communication device.

It is thus an object of the present invention to provide, a telephone seizure unit for allowing a system to dial out when a telephone is in an off-hook position.

It is a further object of the present invention to allow for user flexibility in a detection and notification system.

SUMMARY OF THE INVENTION

The above and additional objects have been met by a security detection system used in conjunction with a telephone seizure unit and/or notification management systems and methods of the present invention. The security detection system includes a detection unit in communication with a remote central server. The detection unit includes a processor and memory, one or more sensors associated with and/or deployed from the detection unit and in communication with the processor. The detection unit is capable of detecting a previously defined triggering event or condition, such as a fire or an intrusion. Detection of the triggering event causes the detection unit's processor to send information, such as an electronic alert, to the server. The information may be sent in the form of, for example, electronic text files, audio files or image files.

In one embodiment of the invention, where the detection unit is connected to the server via a dial-up modem, the security detection system further includes a telephone seizure unit. The telephone seizure unit is capable of being in radio communication with the detection unit and switching communication with a telephonic network. The detection unit recognizes a triggering event which causes it to send out radio frequency signals to instruct the telephone seizure unit to close a switch, thereby preventing communication between the telephone and telephonic network through a main telephone line. Thus, calls that are attempted with the telephone are prevented, except as described below. However, the detection unit remains able to communicate with the telephone line and is thus able to dial out to the remote central server and transmit an information alert which may be, for example, in the form of electronic data. In one example, the switch may be opened, allowing a telephone call to be placed, where an override number is inputted into the telephone.

In another embodiment of the present invention, the detection system further comprises a notification system. Specifically, the server of the present invention may include a pre-programmed database that distributes alerts to designated parties. The subscriber of the system previously designates parties to be notified in the case an alert is received at the server. The subscriber may designate the specific order in which the parties are to be notified. The subscriber may change the designation if desired. An example of a designated party is the subscriber himself. In another example, a human monitoring station is the designated party. The server is programmed to monitor whether a designated party has responded to the sent information. For instance, after electronic information is transmitted to the server, and the subscriber or other designated party or parties fail to respond, the electronic information may be transmitted to a human monitoring station. In one embodiment of the invention, the subscriber may request additional information from the server, or additional information from the detection unit via the server, once electronic information is received. The server may retrieve information from the detection unit and may forward it to the designated party.

DETAILED DESCRIPTION OF THE INVENTION

Figure 1:
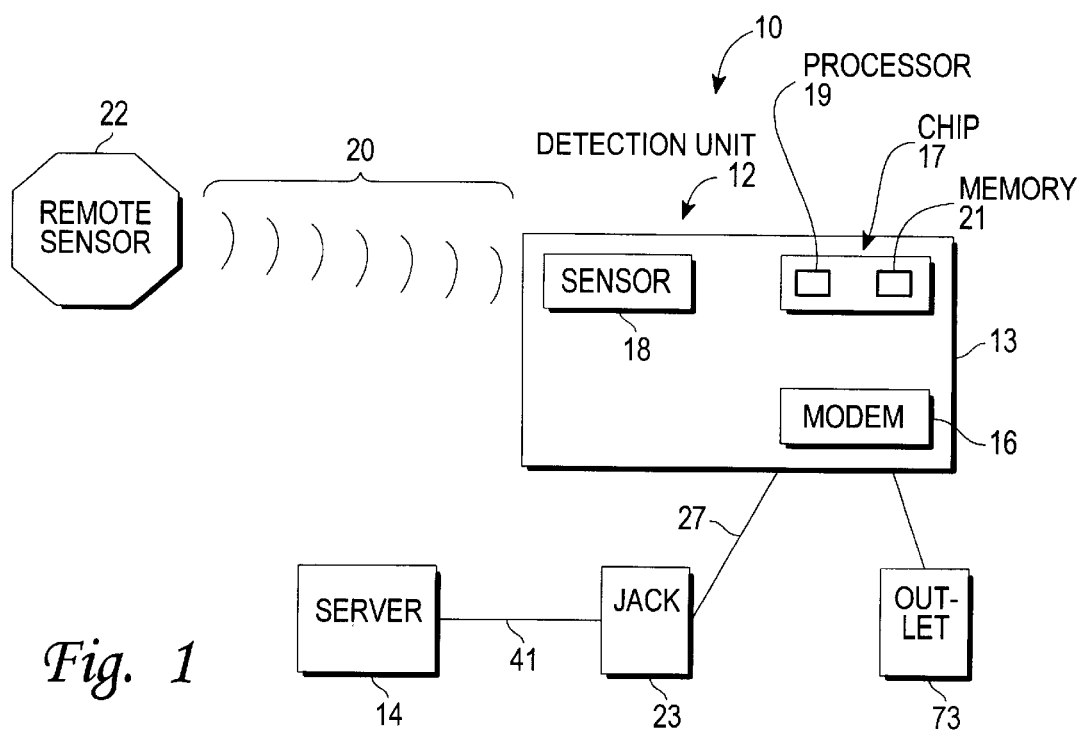
FIG. 1 is a plan and block diagram of a security detection system of the present invention.

With reference to FIG. 1, there is seen a detection system 10 of the present invention used in conjunction with a telephone seizure unit 24 (FIGS. 2A and 2B) and detection and notification system 60 (FIG. 4) of the present invention. The detection system 10 includes a detection unit 12 and a remote central server 14 in communication with the detection unit 12 via, for example, a local dial-up communication path 27 connected to a main telephone line 41. Detection unit housing 13 is approximately the size of a telephone answering machine, or may be larger or smaller if desired. The detection unit 12 includes a modem 16, circuit chip 17, for processing and memory functions and or other computing functions, the chip including, for example, an integrated circuit chip or a chip set. Circuit chip 17 includes processor 19 and memory 21, one or more sensors 18 within the detection unit and in communication with the circuit chip 17. The sensor 18, which is disposed within the detection unit housing 13, includes for example, a motion sensor, an image sensor such as a CCD or CMOS camera, a sound sensor, such as a microphone, a RF sensor and RF receiver or a combination of these and other sensors.

The remote central server 14 is in communication with the detection unit 12 through modem 16. In this example, modem 16 is a dial-up modem within the unit 12 having a dial up connection to the server or an Internet Service Provider. Modem 16 is connected to server 14 via communication path 27 connected to main telephone line 41 through telephone wall jack 23. Alternatively, a broad band (including DSL), cable or wireless modem may be used with a computer, cellular, or non-hard line network or other server connection means known in the art to connect the detection unit 12 to server 14 for communication of information.

The detection unit 12, through sensor 18 and circuit chip 17, detects a previously defined triggering event or condition and sends electronic information, such as an alert, to the server 14. In one example, sensor 18 may include a motion detector. The detection unit 12 may be placed on or near a door (not shown) and upon sensing an intruder, the sensor 18 detects the movement or triggering event, communicates and cooperates with circuit chip 17 and sends information pertaining to the condition to the server 14.

In addition to one or more sensors being disposed within the detection unit 12, the detection system may further include a remote sensor 22 in communication with the detection unit 12. For example, the remote sensor 22 may be affixed to a window or a door in the same or different room as the detection unit 12 and may send a signal, (including for example, a radio frequency signal, hard line, infrared, wire, wireless, or other signal) to the detection unit 12 upon sensing an event. Other triggering events or conditions include, for example detection of an image or the pressing of a panic button or the like.

In one embodiment, the remote sensor 22 may be a smoke detector, and sensor 18 may be a microphone that is listening for sounds from the smoke detector 22 such as sirens or alarms 20 that may occur when the smoke detector detects smoke or a low battery sound. In another example, sensor 18 may be an RF receiver for RF signals from RF remote sensors. The sounding of the smoke detector's siren 20 is an example of a triggering event or condition, that once detected, causes the unit's circuit chip 17 to send an electronic alert to the server 14 via the modem 16. From the modem 16, the alert travels to telephonic path 27 and main telephone line 41 to provide the server with information, such as detection of the smoke alarm 22 going off, stored in memory within the detection unit. The information is sent, for example, in the form of electronic text files, audio files or image files. The server 14 in turn can contact the desired parties, with the notification and management system of the present invention as will be described below, or with an alternative notification means. Remote sensor 22 is optional in the detection system 10.

Figure 2A:
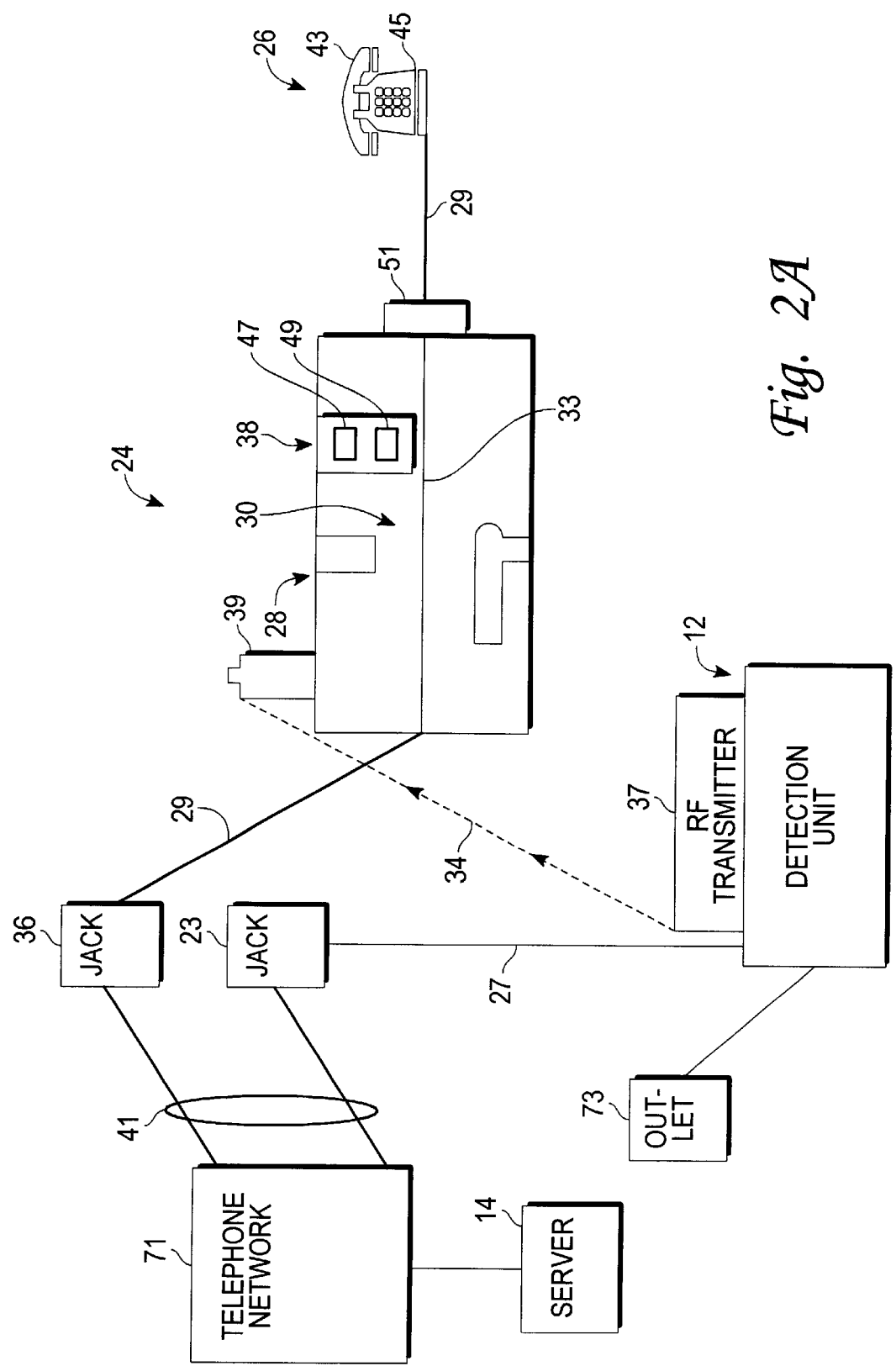
FIG. 2A is a plan and block diagram of a telephone seizure unit of the present invention unit in an open position, in conjunction with a security detection system.

With reference to FIG. 2A, in one embodiment of the present invention, the security detection system including detection unit 12 and server 14, is connected to a telephone seizure unit 24 to form a detection and telephone seizure system. In this example, the detection unit 12 is connected to dial-up telephonic communication path 27 which is connected to telephone jack 23, the jack being connected to main telephone line 41. The detection unit may also be connected to electrical outlet 73 for power or may be powered by other means. The telephone seizure unit is switchable between a state allowing telephonic communication with a telephonic network 71 and a state preventing telephonic communication with a telephone network 71. The telephone seizure unit 24 utilizes the same main telephone line 41 as the detection unit 12.

The telephone seizure unit 24 includes an circuit chip 38 having a processor 47 and memory 49. The telephone seizure unit 24 is connected to a telephone jack 36. The telephone 26 is connected to the telephone seizure unit 24 through a telephonic communication path 29 connected to jack 51 of the unit 24 and to jack 36. The seizure unit 24 includes a local communication path 33 that forms a part of the telephonic communication path 29. The telephone seizure unit 24 has a switch 28 disposed between the telephone 26 and jack 36. In an open state 30 (FIG. 2A), the switch 28 allows communication via main telephone line 41. Thus, communication between telephonic path 29, connected to telephone 26, and telephonic network 71 may occur. In a closed state 32 (FIG. 2B), the switch 28 prevents path 29 from communicating with the main line 41. Thus, communication between telephone 26 to the telephonic network 71 is prevented. The resting state of the seizure unit is the open state 30 (FIG. 2A). In the open state, it is seen that path 33 (disposed within telephone seizure unit 24) of telephonic line 29 is unobstructed and capable of telephonic communication with the network 71. Therefore, the line 29 is capable of telephonic communication with the telephonic network 71.

Figure 2B:
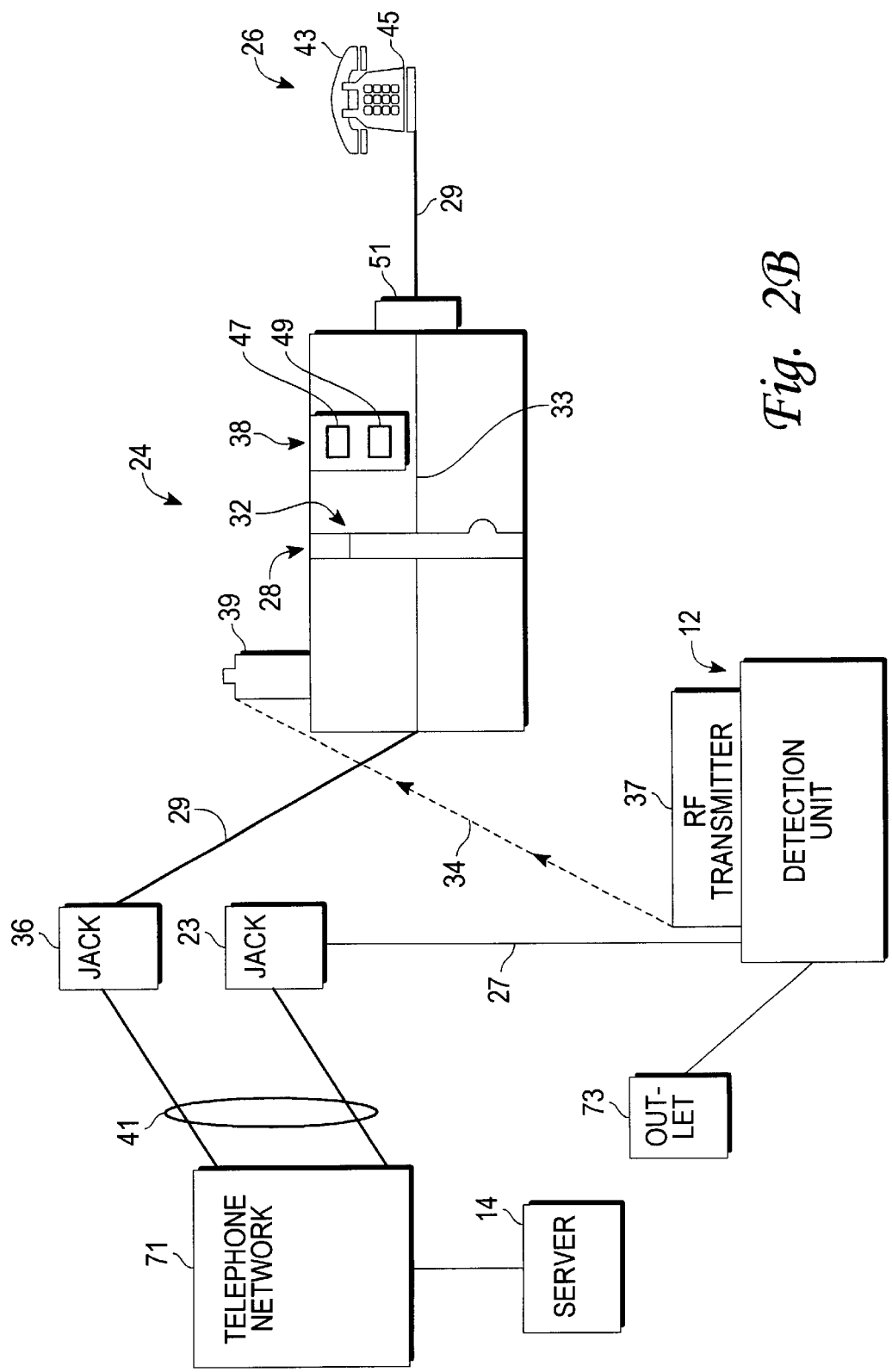
FIG. 2B is a plan and block diagram of the telephone seizure unit and security detection system of FIG. 2A, with the telephone seizure unit in a closed position.

Referring to FIG. 2A, in use, the detection unit 12 recognizes a trigger or condition, such as the detection of a smoke alarm as described above, or the detection of an intruder, that cause it to send out radio frequency signals 34 from a radio frequency transmitter 37. When the radio frequency signals 34 from the detection unit 12 are received by a radio frequency receiver 39, the switch 28 is programmed to switch to a closed state, as shown in FIG. 2B. Accordingly, communication between the local communication path 33 and the main telephone line 41 is prevented, thereby preventing communication between the telephone 26 and the telephonic network 71. Calls from an outside party may not be received with the telephone 26 and calls may not be placed with telephone 26, except as will be described below, when the switch 28 is in the closed state, without obstructing communication between the detection unit 12 and the server 14. The detection unit 12 remains capable of communicating with the main telephone line 41 and is thus free to dial out to the remote central server 14 (via telephone network 71, for example) for alert notification or transmission of other desired information without disruption by an intruder or other party.

Typically, as known in the prior art, telephone 26 includes a hook switch (not shown), which connects and disconnects the telephone 26 to the telephonic network 71. Upon lifting of a handset 43, the hook switch connects the telephone to the network rendering other dialing devices incapable of dialing on the same main telephone line 41. Upon returning of the handset 43 to telephone base 45, the telephone is disconnected from the network thus allowing dialing of other telephones on the same line 41. The telephone seizure unit 24 seizes the telephonic communication path 29 and renders the telephone incapable of communicating with the telephonic network without establishing a connection to the telephonic network. Thus, the detection unit 12 is free to dial out. All telephones connected to a telephone seizure unit 24 will have telephonic communication prevented upon activation of the telephone seizure unit.

In the prior art, the action of an intruder or other person picking up the telephone receiver 43 from base 45 would prevent an alarm system, connected to the same telephone line as the telephone that was tampered with or lifted, from dialing out. As is known in the art, when more than one telephone is connected to the same telephone line and the receiver from one of the telephones is lifted from its base, it is not possible to dial out on any of the telephones connected to the same telephone line. With the present invention, the action of a person lifting up the telephone receiver is not sufficient to disrupt the communication path between the detection unit 12 and the server 14 because the communication path between the telephone 26 and the telephonic network 71 is obstructed upon sensing of a triggering event and before a connection to the network occurs. Therefore, the detection unit 12 can contact the server 14, and the server can contact the desired parties when the telephone receiver 43 is lifted from its base 45.

The circuit chip 38, of the telephone seizure unit 24 includes firmware that recognizes a specific trigger or triggers that, when input on the telephone 26 when the switch 28 is in the closed state (FIG. 2B), will cause the integrated circuit chip 38 to open the switch (FIG. 2A), overriding the resulting seizing action caused by the first triggering event or condition described above. An example of a trigger that causes the switch 24 to open is the input of 911 in the keypad of the telephone. Alternatively, other numbers and pass codes may be programmed to be recognized as an override code by the telephone seizure unit 24. When the switch 28 is opened, a telephonic connection between the telephone 26 and the main telephone line 41 is re-established so that telephone calls may be placed and received. In one embodiment of the invention, telephone 26 is prevented from communication with telephone network 71, until an override code is inputted into the telephone.

Figure 3:
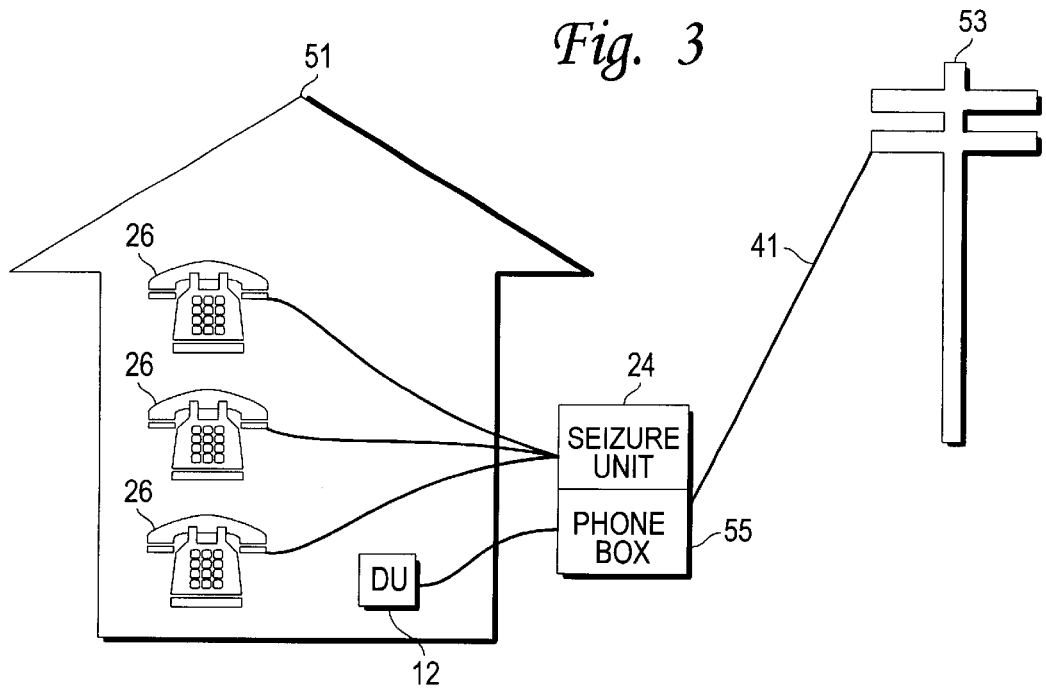
FIG. 3 is a plan and block diagram of an alternative embodiment of a telephone seizure unit of FIG. 2, in conjunction with a security and detection system.

The telephone seizure unit 24 may be disposed in various locations. In an in-wire version, as seen in FIGS. 2A and 2B, the telephone seizure unit is located in between the telephone 26 and the telephone jack 36. With reference to FIG. 3, in another embodiment, the telephone seizure unit 24 is located outside a building 51 and is connected to a main telephone junction box 55 which controls access to all telephones 26 and to detection unit 12 if operational via a dial-up modem, and is connected to telephone pole 53 via main telephone line 41 In this way, one seizure unit 24 can control the telephonic communication capability of more than one telephone 26 within the building 51.

Figure 4:
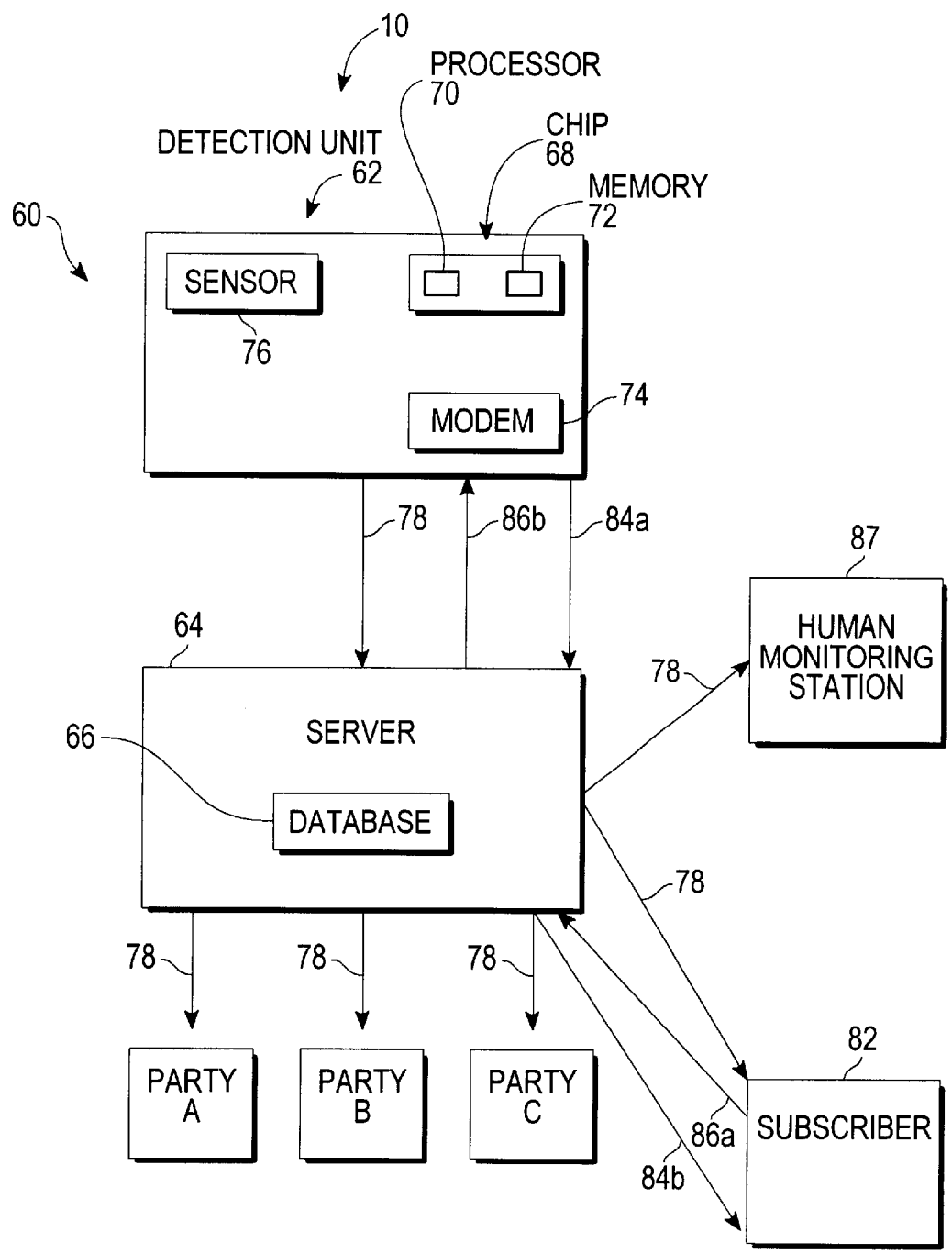
FIG. 4 is a block diagram of a security detection and notification system of the present invention.

With reference to FIG. 4, a detection and notification system 60 of the present invention is seen. Detection unit 62 is in communication with a remote server 64 having a programmed database 66. Detection unit 62 includes, as described above, circuit chip 68, such as an integrated circuit chip or other chips, or a chip set including, but not limited to, processor 70 and memory 72, a modem 74 (for example, dial-up, broad band, cable or wireless), one or more sensors 76 associated with and/or deployed from the detection unit 62. Sensors 76 include for example, motion sensors, sound sensors, and image sensors and other sensors, as described above, or as otherwise known in the art. Sensors 76 may be included within the detection unit 62 and/or the detection unit 12 may receive input from remote sensors, as described previously. The remote server 64 is in communication with the detection unit 62. Server 64 communicates with circuit chip 68 of the detection unit through the modem 74 within the unit 62. A phone seizure unit 28, as described above, may also be employed, in one example, in system 60.

When the detection unit 62, through sensor 76, detects a triggering event or condition, the circuit chip 68 of the unit 62 sends information 78 pertaining or related to the condition, such as an electronic alert, to the server 64 via a connection through the modem 74. The information 78 including alert information from the detection unit and/or other additional information from the database pertaining to the condition is sent electronically in the form of, for example, electronic messaging (sent to a wide variety of devices), electronic text files, audio files, image files or in other desired forms. Server 64, referencing database 66, automatically distributes information, via for example, the Internet, a traditional phone network or other desired means in an electronic format to parties to alert, including for example, the subscriber 82 and parties A, B, and C, when a triggering event or condition has occurred. A party, for example, the subscriber, previously designates the parties to be notified of the occurrence of a condition and may designate a sequence of notification. Database 66 is programmed accordingly to store the designation of parties including, for example, various means to contact the identified parties. The subscriber 82 may change the designation of parties as desired. The parties designated may change depending upon the type of condition detected. For example, if an intruder were detected, Party A would be notified whereas if smoke were detected, Party B would be notified. In one example, the specific type of information being sent may differ depending upon the particular party. The sequence of notification may be temporary and/or permanent with regard to all or one or more of the designated parties. The sequence may occur on a changeable schedule. The sequence of notification may be sequential and/or simultaneous with regard to all or one or more of the designated parties. For example, the designated party may receive a message such as an email message presenting an image of an intruder, or a cellular phone message or page to a pager stating that there is an intruder. An example of a designated party may be a human monitoring station 87. Information, such as alerts, may be transmitted directly to the human monitoring station 87. This is desirable, for example, if a subscriber is away on vacation.

Once the server 64 has contacted the subscriber 82 or other designated party via the Internet or other means, the subscriber 82 or other designated party is able to request additional information from the detection unit 62 via the server 64. For example, the subscriber may request information, as indicated by arrow 86a, stored at server 64, such as images from a particular image sensor (for example, a camera) of, or associated with, the detection unit 62. Alternatively, the subscriber may request information as indicated by arrow 86b that is retrieved from the detection unit. The server may retrieve requested information, as indicated by arrow 84a, from the detection unit 62 and send it to the requestor. Alternatively, information stored at the server is sent to requestor, as indicated by arrow 84b.

In one embodiment, the server 64 monitors whether a designated party has responded to the sent electronic information 78. A designated party's response may be in the form in which the message was sent to the designated party. For instance, it may be a responding email, phone call, or page sent to the server indicating an awareness of the condition. In one example, the server response to a detected condition is controlled by the designated party via a contact device. For instance, server 64 sends a telephone message to designated party in the form of a telephone message indicating, for example, that there has been an intrusion. The designated party may respond by pressing numeral 1 on their telephone to hear sounds at the location where the intrusion occurred, numeral 2 to see images at the location where the intrusion occurred, numeral 3 to cancel the alert, or numeral 4 to send the information regarding the intrusion to human monitoring station 87.

In another example, if a designated party, for example, the subscriber 82, does not respond to the electronic information 78, or if the server fails to detect a response, within for example a pre-designated time frame, the server 64 may be programmed to send the information to human monitoring station 87. The human monitoring station may be part of the same company operating the condition detection and notification system or may be a separate company or entity hired by the operating company. In one example, the subscriber may choose to not have the information sent to the human monitoring station, no matter whether a designated party fails to respond to the server within a specific time frame, or fails to respond at all.

In another embodiment, if one of a plurality of designated parties fails to respond to the electronic information 78, the information can be sent to the human monitoring station 87 by the server or additional parties. Parties may be grouped into parties to be notified upon receipt of electronic information 78 and parties to be notified if the parties to be notified upon receipt of electronic information 78 failed to respond. Alternatively, if all of the designated parties fail to respond to the message through the server, the information 78 can be sent to the human monitoring station 87 from the server 64.

In another embodiment, the subscriber 82, according to a previously designated schedule, or based upon an ad hoc communication, may request and receive images and/or sound track from the server 64. In this instance, a triggering event or condition is not needed for the server to transfer information to a party. Information may be requested through a website or through a touch tone telephone in communication with the server 64 communicating with the detection unit 62. The detection unit 62 is programmable and may send data to the server 64 on a programmed schedule. The server 64 can distribute information via the Internet, a traditional phone network or other desired means.

In one embodiment the detection unit 62, records information, such as images and/or sound track, before the sensor 76 detects a triggering event or condition. Subscriber 82 may request the images, which are stored at the server, at any time or at a predetermined time or ad hoc images and/or sound from the detection unit. Therefore, images that occurred during various time frames in the past may be compared. For example, images that were recorded before a triggering event, such as an intrusion or a fire, may be stored and compared to images recorded after a triggering event.

In another embodiment the detection unit 62 is programmed to keep track of pass codes entered into the detection unit by users. For example, a user, such as a child or an employee enters a pass code assigned to that person into the unit 62 upon arrival to and/or departure from a location such as work or home. The pass code is recorded in the unit 62 upon entry. The unit 62 may take an image of the user and may record audio information associated with the user before and/or after the user has entered his/her pass code. This information of the user who entered the pass code, including for example, images and sounds associated with the user, and date and time entry of the pass code, may be transmitted immediately to a desired party (such as a parent or employer) or may be stored for later transmittal. Alternatively, at the end of a specified period, the information recorded within the unit 62 can be used to prepare an opening and closing report. In one example, the recorded information is sent to the server 64. The server 64 then creates the opening and closing report and distributes it to a desired party via email or other desired means.

In another embodiment, the server 64 includes a clock (not shown) and is programmed to notify the subscriber of a triggering event such as for example, his shop not opening at a scheduled time. This is called an "Exception Alert".

In one embodiment, the subscriber 82 may wish to use the detection unit while he is at home. However, the subscriber may need to access certain areas of the home that have one or more detection units 62 or remote sensors associated with the detection unit(s) that are in use. In the present invention, the subscriber is able to program the detection unit 62 so that when a particular sensor 76 or remote sensors, designated by the subscriber, sense a triggering event or condition, the detection unit 62 will ignore the alert given in response to the triggering event for a designated period of time. This allows the subscriber to access an area of his home without the detection unit 62 and server 64 contacting a designated party upon detection of a triggering event.

For example, the subscriber may wish to open a door to the basement (not shown). Sensors that are deployed from the detection unit 62 may be placed on/affixed to the exterior surface of the door. The opening of the door is an example of a triggering event. The detection unit 62 may be programmed to ignore any alert sensed from a sensor or sensors affixed to the basement door for a certain or programmed period of time. The detection unit 62 may thus be programmed to ignore certain designated sensor/sensors (for example, a basement door sensor) and to respond to another sensor or sensors (for example, a front door sensor).

What is claimed is:

1. A condition detection and telephone seizure system comprising:
    a telephone seizure unit disposed in between and connected to a telephone and a telephone jack associated with a telephone line, said telephone seizure unit including a switch having a open state, allowing for telephonic communication by said telephone via said telephone line, and a closed state, preventing telephonic communication by said telephone via the telephone jack through said telephone line; and
    a detection unit capable of communication with a server via said telephone line and capable of detecting a condition, wherein upon detection of said condition said detection unit is placed in radio frequency communication with said telephone seizure unit causing said switch to be placed in said closed state, wherein said detection unit remains capable of communication with said server via said telephone line when said switch is in said closed state.

2. The system of claim 1 further comprising a second telephone jack, said jack connected to said detection unit via said telephone line.

3. The system of claim 1 wherein said telephone seizure unit includes a circuit chip.

4. The system of claim 1 wherein said detection unit includes a modem.

5. The system of claim 1 wherein detection unit includes a circuit chip.

6. The system of claim 1 further comprising a telephonically inputted pre-designated code causing said switch to be placed into said open state from said closed state.

7. The system of claim 1 wherein said detection unit communicates information to said server upon detection of said condition.

8. The system of claim 7 wherein said information is electronic.

9. The system of claim 1 wherein said telephone seizure unit is connected to a phone junction box.

10. The system of claim 1 wherein said server is a remote server having a programmed database storing at least one designation of a party, said server connected to and programmed to receive said information transmitted by said detection unit and to distribute said information to at least one designated party according to said programmed database.

11. The system of claim 10 wherein said server has means for monitoring whether said designated party has responded to said information and means for sending said information to another designated party if said at least one designated party has not responded to said information.

12. A condition detection and notification system comprising:
    a programmable detection unit capable of detecting a condition, generating electronic information related to said condition, and transmitting said electronic information;
    a remote server having a programmed database storing at least one designation of a party, said server connected to and programmed to receive said electronic information transmitted by said detection unit and to send said electronic information to at least one designated party according to said programmed database, said server having means for monitoring whether said designated party has responded to said electronic information.

13. The system of claim 12 wherein said designated party is a human monitoring station and said server is programmed to send said electronic information to said human monitoring station.

14. The system of claim 12 wherein said server is programmed to send said electronic information to a human monitoring station if said designated party has not responded to said electronic information.

15. The system of claim 12 wherein said server is capable of retrieving additional information from said detection unit upon request from said designated party.

16. The system of claim 15 wherein said detection unit includes a camera and said electronic information includes images sent to said remote server upon request from said designated party.

17. The system of claim 12 wherein said detection unit includes an audio sensor and said electronic information includes audio files.

18. The system of claim 12 wherein distribution of electronic information to said designated parties occurs simultaneously.

19. The system of claim 12 further comprising an Internet connection to said server.

20. The system of claim 12 wherein electronic information distribution is to a first plurality of designated parties.

21. The system of claim 20 wherein if said first plurality of designated parties fail to respond to said electronic information, said electronic information is sent to at least one different designated party.

22. The system of claim 12 wherein said designated party is a human monitoring station and said server is programmed to send said electronic information to said human monitoring station.

23. The system of claim 20 wherein if none of said first plurality of designated parties respond to said electronic information said server is programmed to send said electronic information to a human monitoring station.

24. The system of claim 12 wherein a first designated party receives said information and a second designated party receives a portion of said information.

25. The system of claim 12 wherein said detection unit includes a sensor.

26. The system of claim 12 further comprising a phone seizure unit in communication with said detection unit.

27. A method for detecting a condition and notifying a designated party of the condition, comprising the steps of:
    detecting a condition and generating electronic information related to said condition at a detection unit;

transmitting said electronic information to a remote server from said detection unit;

receiving said electronic information at said server;

sending said electronic information at said server to at least one designated party according to a designation of a programmed database of said server; and monitoring at said server whether said designated party has responded to said electronic information.

28. The method of claim 27 wherein if said designated party has not responded to said electronic information, further comprising sending said electronic information from said server to a human monitoring station.

29. The method of claim 27 wherein if said at least one designated party fails to respond to said electronic information, said server sends said electronic information to at least one different designated party.

30. The method of claim 27 further comprising said designated party requesting additional information from said detection unit via said server, retrieving said additional information from said detection unit at said server, and sending said requested information from said server to said designated party.

31. The method of claim 27 further comprising programming said detection unit to suspend distribution of said electronic information for a designated area and for a designated amount of time.

32. The method of claim 27 wherein said electronic information is a telephone message.

33. The method of claim 32 further comprising entering of a telephonic numeral by said designated party to control a server response.

34. The method of claim 27 further comprising sending said information to said designated party according to a schedule.

35. A condition detection and notification system comprising:

a programmable detection unit capable of detecting a condition, generating electronic information related to said condition, and transmitting said electronic information;

a remote server having a programmed database storing at least one designation of a party, said server connected to and programmed to receive said electronic information transmitted by said detection unit and to send said electronic information to at least one designated party according to said programmed database, said server having means for retrieving additional information from said detection unit upon request from said designated party.

36. The system of claim 35 wherein said detection unit includes a sensor.

37. The system of claim 36 wherein said sensor includes a camera recording images prior to images being sent to said remote server.

38. The system of claim 35 wherein said additional information includes different electronic images from an additional sensor associated with said detection unit.

39. The system of claim 35 wherein sending of electronic information is to a plurality of designated parties.

40. The system of claim 39 wherein said server is programmed to send said electronic information to a human monitoring division if none of said plurality of designated parties responds to said electronic information.

* * * * *